(12) United States Patent
Sugiura et al.

(10) Patent No.: US 9,105,898 B2
(45) Date of Patent: Aug. 11, 2015

(54) FUEL CELL

(71) Applicant: HONDA MOTOR CO., LTD., Tokyo (JP)

(72) Inventors: Seiji Sugiura, Wako (JP); Shuhei Goto, Wako (JP); Kentaro Ishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 109 days.

(21) Appl. No.: 13/779,743

(22) Filed: Feb. 28, 2013

(65) Prior Publication Data

US 2013/0236808 A1 Sep. 12, 2013

(30) Foreign Application Priority Data

Mar. 9, 2012 (JP) ................................. 2012-052968

(51) Int. Cl.
| | |
|---|---|
| *H01M 2/38* | (2006.01) |
| *H01M 8/10* | (2006.01) |
| *H01M 8/24* | (2006.01) |
| *H01M 8/02* | (2006.01) |

(52) U.S. Cl.
CPC .......... *H01M 8/1004* (2013.01); *H01M 8/0258* (2013.01); *H01M 8/0267* (2013.01); *H01M 8/0271* (2013.01); *H01M 8/246* (2013.01); *Y02E 60/521* (2013.01)

(58) Field of Classification Search
CPC ............ H01M 8/1004; H01M 8/0267; H01M 8/0276; H01M 8/04156; H01M 8/028; Y02E 60/521
USPC .......... 429/414, 450, 456, 457, 460, 508, 510
See application file for complete search history.

(56) References Cited

U.S. PATENT DOCUMENTS

| | | | |
|---|---|---|---|
| 2005/0048342 A1* | 3/2005 | Wakahoi et al. ................. | 429/30 |
| 2010/0047649 A1 | 2/2010 | Yamada et al. | |
| 2010/0209811 A1 | 8/2010 | Barnwell et al. | |
| 2011/0281195 A1* | 11/2011 | Fuller et al. .................... | 429/467 |

FOREIGN PATENT DOCUMENTS

| | | |
|---|---|---|
| JP | 05-021077 | 1/1993 |
| JP | 10-172587 | 6/1998 |
| JP | 2008-130432 | 6/2008 |
| JP | 2010-040278 | 2/2010 |
| JP | 2012-199217 | 10/2012 |

* cited by examiner

*Primary Examiner* — Patrick Ryan
*Assistant Examiner* — Ben Lewis
(74) *Attorney, Agent, or Firm* — Mori & Ward, LLP

(57) ABSTRACT

A fuel cell includes a membrane electrode assembly and a separator. The separator includes a water accumulation portion including at least one of a buffer portion, a lowermost channel groove, a channel junction portion, and a bypass channel. The buffer portion is connected to a reactant gas channel through which a reactant gas is to flow along a power generation surface of the membrane electrode assembly. The channel groove is provided in the reactant gas channel and located at a lowest position in the reactant gas channel in a direction of gravity when the membrane electrode assembly and the separator are in an upright position. Channel grooves of the reactant gas channel are joined in the channel junction portion. The membrane electrode assembly includes a water impermeable layer which is disposed outside of a power generation region and which faces the water accumulation portion.

10 Claims, 17 Drawing Sheets

FUEL CELL

CROSS-REFERENCE TO RELATED APPLICATIONS

The present application claims priority under 35 U.S.C. §119 to Japanese Patent Application No. 2012-052968, filed Mar. 9, 2012, entitled "Fuel Cell." The contents of this application are incorporated herein by reference in their entirety.

BACKGROUND OF THE INVENTION

1. Field of the Invention

The present disclosure relates to a fuel cell.

2. Discussion of the Background

For example, a solid polymer electrolyte fuel cell, which is a power generation cell, includes a membrane electrode assembly (MEA) and a pair of separators sandwiching the MEA therebetween. The MEA includes a solid polymer electrolyte membrane, which is a polymer ion-exchange membrane, and an anode electrode and a cathode electrode sandwiching the solid polymer electrolyte membrane therebetween. A fuel cell stack, which usually includes a plurality of power generation cells that are stacked, is used in a stationary usage or used as a vehicle fuel cell system mounted in a fuel cell vehicle.

In the fuel cell, a fuel gas channel (also referred to as a reactant gas channel), through which a fuel gas flows to the anode electrode, is formed on a surface of one of the separators; and an oxidant gas channel (also referred to as a reactant gas channel), through which an oxidant gas flows to the cathode electrode, is formed on a surface of the other separator. Moreover, for each power generation cell or for a group of power generation cells, a coolant channel, through which a coolant flows, is formed along a surface of a separator.

In such a fuel cell, it is necessary to humidify the electrolyte membrane in order to keep good ion conductivity. Therefore, an oxidant gas (for example, air) and a fuel gas (for example, hydrogen gas), which are reactant gases, are humidified and supplied to the fuel cell.

Water used for moisturizing the electrolyte membrane may not be absorbed by the electrolyte membrane and liquid water may accumulate in the reactant gas channel. In the fuel cell, water is generated in the cathode electrode due to a power generation reaction, and the generated water is back-diffused to the anode electrode through the electrolyte membrane. Therefore, water may condense and accumulate in the reactant gas channel. Therefore, in particular, on the cathode electrode side, which has a higher electric potential, a metal may leach into accumulated water and the metal may be trapped into the electrolyte membrane. Thus, there is a problem in that the electrolyte membrane deteriorates rapidly due to metal ions.

For example, Japanese Unexamined Patent Application Publication No. 5-21077 discloses a sealing structure to address this problem. As illustrated in FIG. 17, the sealing structure is incorporated in a solid polymer electrolyte fuel cell 1.

The fuel cell 1 includes an MEA 2 including a solid polymer electrolyte membrane 2a sandwiched between an anode electrode 2b and a cathode electrode 2c. The MEA 2 is sandwiched between an anode separator 3, on which a fuel channel 3a is formed, and a cathode separator 4, on an oxidant channel 4a is formed.

In the MEA 2, the solid polymer electrolyte membrane 2a has a surface area that is larger than that of each of the anode electrode 2b and the cathode electrode 2c. Frame-like protection films 5 are disposed on both surfaces of a peripheral portion of the solid polymer electrolyte membrane 2a.

Outer peripheral portions of the protection films 5 include portions that overlap the outer peripheries of the anode electrode 2b and the cathode electrode 2c. A pair of gas sealing members 6, each having a frame-like shape, are disposed in the outer periphery of the anode electrode 2b and the cathode electrode 2c.

Thus, the outer peripheral portions of the protection films 5, which are fixed to the solid polymer electrolyte membrane 2a, are sandwiched between the pair of gas sealing members 6; and inner peripheral portions of the protection films 5 are sandwiched between the anode electrode 2b and the cathode electrode 2c. Therefore, the solid polymer electrolyte membrane 2a is prevented from becoming damaged and can have gas sealability.

SUMMARY OF THE INVENTION

According to one aspect of the present invention, a fuel cell includes a membrane electrode assembly and a separator. The membrane electrode assembly includes a first electrode, a second electrode, and a solid polymer electrolyte membrane provided between the first electrode and the second electrode in a stacking direction. The membrane electrode assembly and the separator are stacked in the stacking direction. The separator includes a water accumulation portion comprising at least one of a buffer portion, a channel groove, a channel junction portion, and a bypass channel. The buffer portion is connected to a reactant gas channel through which a reactant gas is to flow along a power generation surface of the membrane electrode assembly. The channel groove is provided in the reactant gas channel and located at a lowest position in the reactant gas channel in a direction of gravity when the membrane electrode assembly and the separator are in an upright position. Channel grooves of the reactant gas channel are joined in the channel junction portion. The bypass channel is to bypass the reactant gas channel. The membrane electrode assembly includes a water impermeable layer which is disposed outside of a power generation region of the membrane electrode assembly and which faces the water accumulation portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
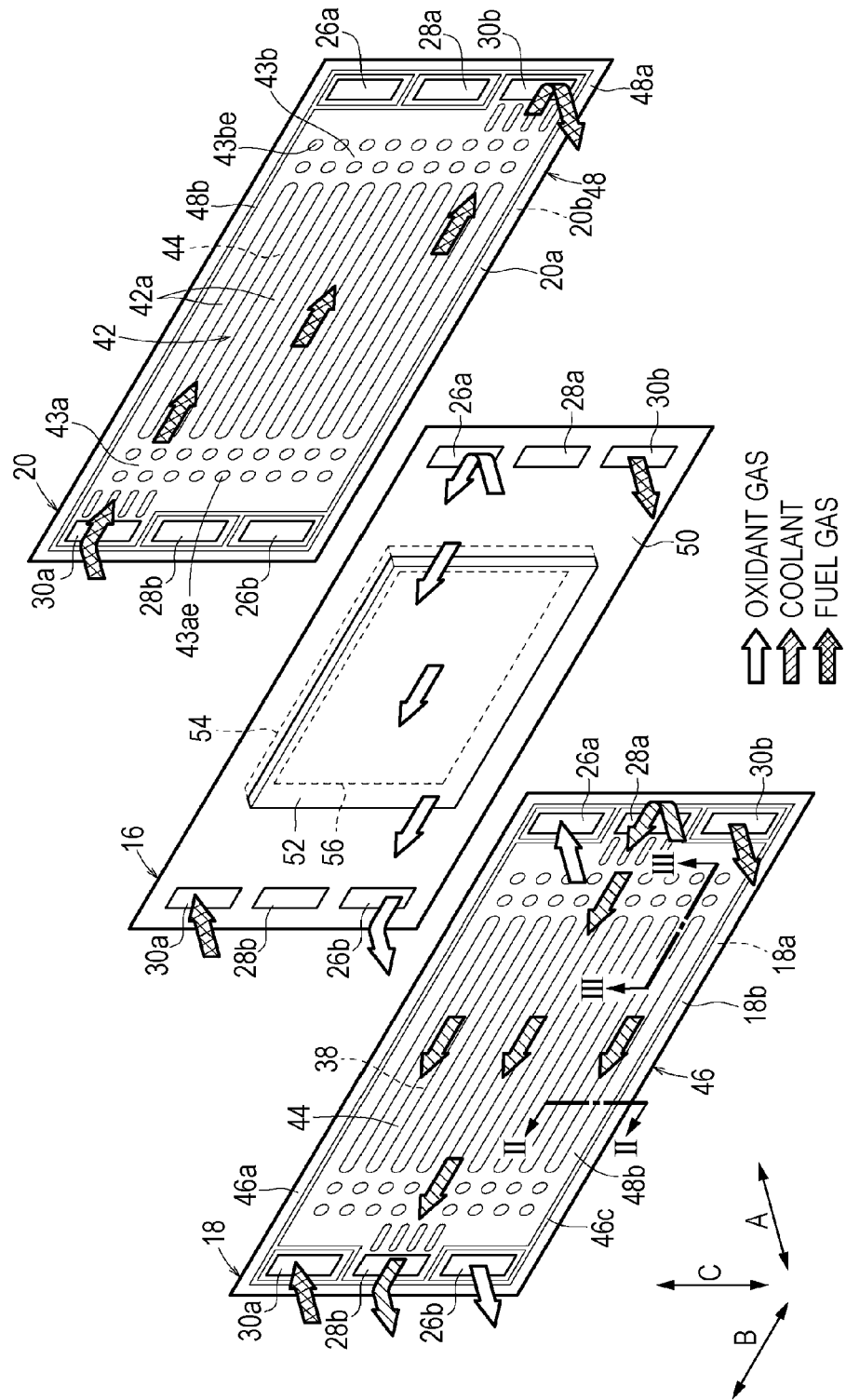
FIG. 1 is an exploded perspective view of a power generation cell of a fuel cell according to a first embodiment.

The embodiments will now be described with reference to the accompanying drawings, wherein like reference numerals designate corresponding or identical elements throughout the various drawings.

Figure 2:
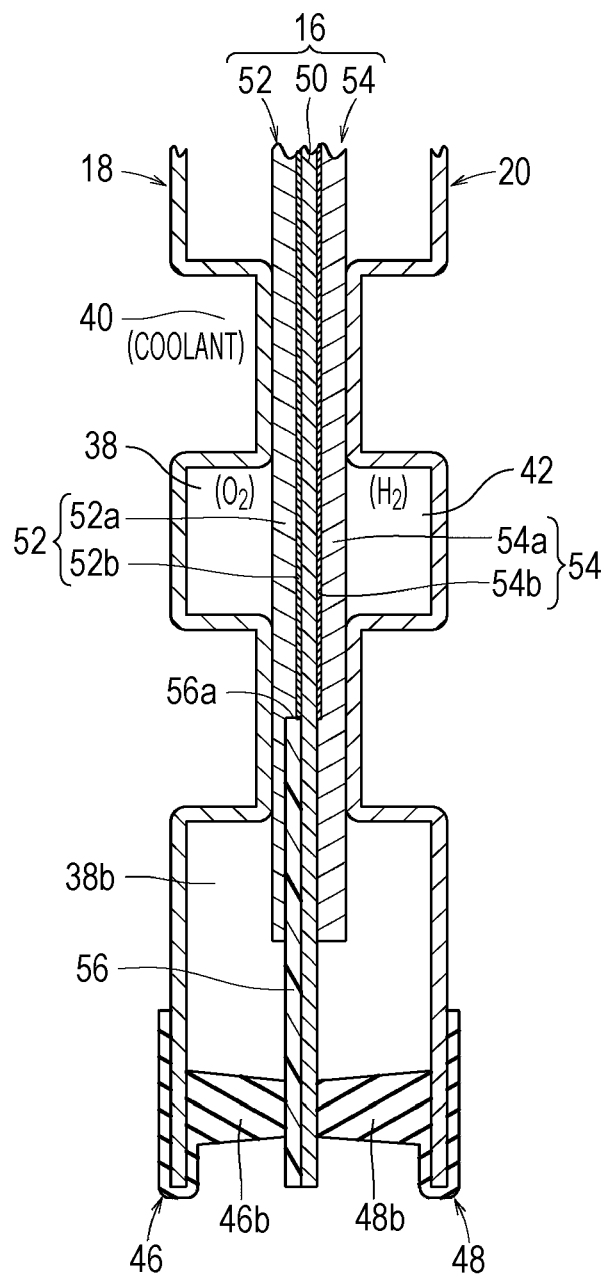
FIG. 2 is a sectional view of the power generation cell taken along line II-II of FIG. 1.

As illustrated in FIGS. 1 and 2, a fuel cell 10 according to a first embodiment includes a plurality of power generation cells 12 that are disposed in upright positions and stacked in the horizontal direction (direction of arrow A, stacking direction).

Each of the power generation cells 12 include a membrane electrode assembly (MEA) 16 and first and second separators 18 and 20 sandwiching the membrane electrode assembly 16 therebetween. The first separator 18 and the second separator 20, which have protruding portions and recesses in sectional views (see FIGS. 2 and 3), are each made by pressing a metal plate so as to form wave-like shapes or dimple-like shapes on the metal plate. The first separator 18 and the second separator 20 may be made from carbon plates instead of the metal plates.

An oxidant gas inlet manifold 26a, a coolant inlet manifold 28a, and a fuel gas outlet manifold 30b extend in the direction of arrow A through one end portion of the power generation cell 12 in the longitudinal direction (direction of arrow B in FIG. 1). An oxidant gas, such as an oxygen-containing gas, is supplied through the oxidant gas inlet manifold 26a. A coolant is supplied through the coolant inlet manifold 28a. A fuel gas, such as a hydrogen-containing gas, is discharged through the fuel gas outlet manifold 30b.

A fuel gas inlet manifold 30a, a coolant outlet manifold 28b, and an oxidant gas outlet manifold 26b extend in the direction of arrow A through the other end portion of the power generation cell 12 in the longitudinal direction. The fuel gas is supplied through the fuel gas inlet manifold 30a. The coolant is discharged through the coolant outlet manifold 28b. The oxidant gas is discharged through the oxidant gas outlet manifold 26b.

Figure 4:
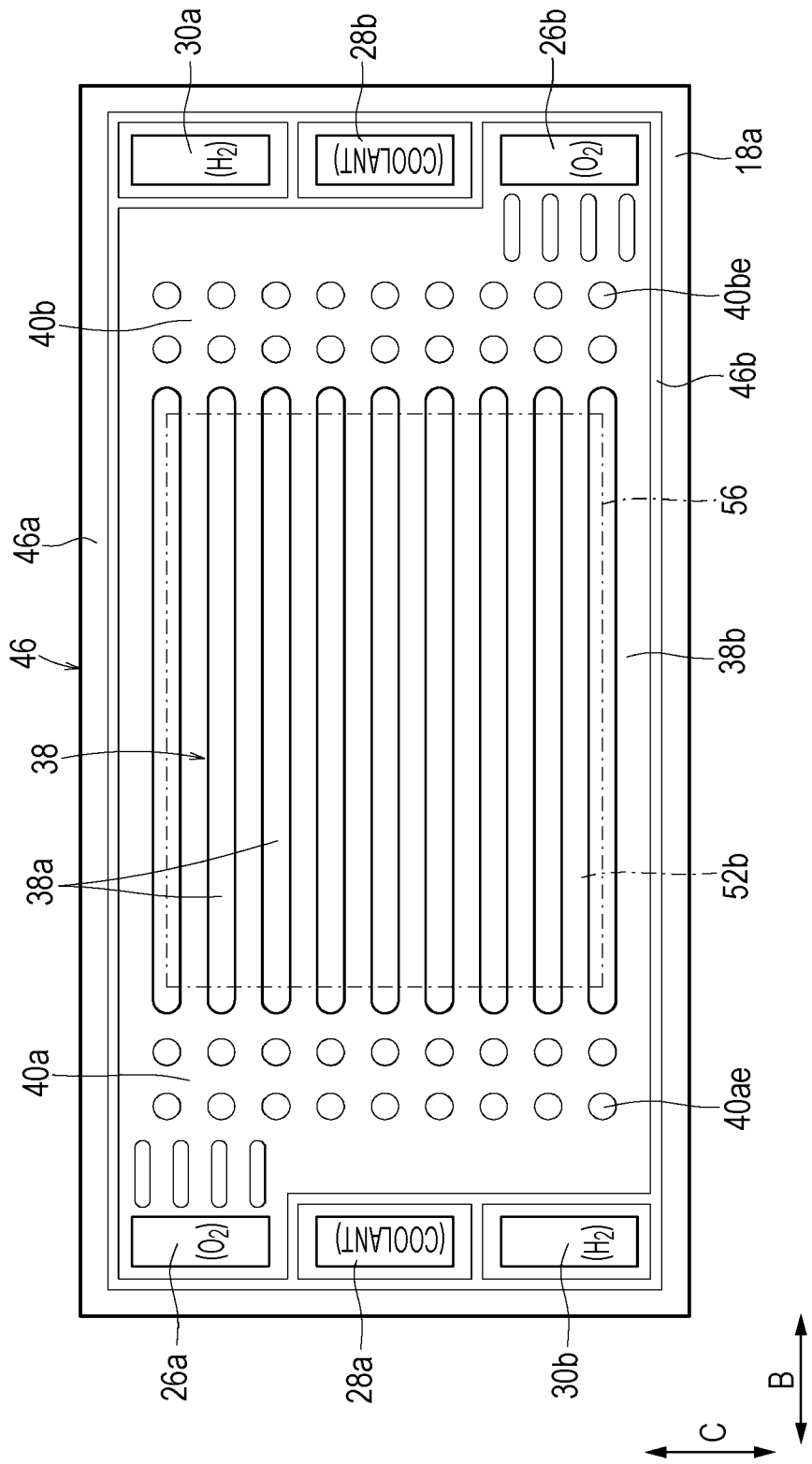
FIG. 4 is a plan view of a first separator of the power generation cell.

As illustrated in FIG. 4, an oxidant gas channel 38, through which the oxidant gas inlet manifold 26a and the oxidant gas outlet manifold 26b are connected to each other, is formed on a surface 18a of the first separator 18 facing the membrane electrode assembly 16. The oxidant gas channel 38 is formed, for example, between a plurality of protruding portions 38a extending in the direction of arrow B. An inlet buffer portion 40a having a plurality of embossed portions 40ae is disposed on the inlet side of the oxidant gas channel 38. An outlet buffer portion 40b having a plurality of embossed portions 40be is disposed on the outlet side of the oxidant gas channel 38.

As illustrated in FIG. 1, a fuel gas channel 42, through which the fuel gas inlet manifold 30a and the fuel gas outlet manifold 30b are connected to each other, is formed on a surface 20a of the second separator 20 facing the membrane electrode assembly 16. The fuel gas channel 42 is formed, for example, between a plurality of protruding portions 42a extending in the direction of arrow B.

An inlet buffer portion 43a having a plurality of embossed portions 43ae is disposed on the inlet side of the fuel gas channel 42. An outlet buffer portion 43b having a plurality of embossed portions 43be is disposed on the outlet side of the fuel gas channel 42. The membrane electrode assembly 16 is sandwiched between the embossed portions 40ae and 40be and the embossed portions 43be and 43ae. The same applies to second to seventh embodiments described below.

A coolant channel 44, through which the coolant inlet manifold 28a and the coolant outlet manifold 28b are connected to each other, is integrally formed between a surface 18b of the first separator 18 and a surface 20b of the second separator 20. The coolant channel 44 is formed between the back side of the oxidant gas channel 38 and the back side of the fuel gas channel 42.

A first sealing member 46 is integrally formed on the surfaces 18a and 18b of the first separator 18 so as to surround the outer periphery of the first separator 18. A second sealing member 48 is integrally formed on the surfaces 20a and 20b of the second separator 20 so as to surround the outer periphery of the second separator 20.

The first sealing member 46 and the second sealing member 48 are made from a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

As illustrated in FIGS. 1 and 4, the first sealing member 46 includes a planar sealing portion 46a formed on the surfaces 18a and 18b and having a uniform thickness. The first sealing member 46 includes a protruding sealing portion 46b (see FIG. 4), which protrudes from the planar sealing portion 46a on the surface 18a side. The protruding sealing portion 46b makes the oxidant gas inlet manifold 26a and the oxidant gas outlet manifold 26b be connected to the oxidant gas channel 38.

The first sealing member 46 includes a protruding sealing portion 46c (see FIG. 1), which protrudes from the planar sealing portion 46a on the surface 18b side. The protruding sealing portion 46c makes the coolant inlet manifold 28a and the coolant outlet manifold 28b be connected to the coolant channel 44.

The second sealing member 48 includes a planar sealing portion 48a formed on the surfaces 20a and 20b and having a uniform thickness. The second sealing member 48 includes a protruding sealing portion 48b, which protrudes from the planar sealing portion 48a on the surface 20a side. The protruding sealing portion 48b makes the fuel gas inlet manifold 30a and the fuel gas outlet manifold 30b be connected to the fuel gas channel 42.

The membrane electrode assembly 16 includes a solid polymer electrolyte membrane 50, and a cathode electrode 52 and an anode electrode 54 sandwiching the solid polymer electrolyte membrane 50 therebetween. The solid polymer electrolyte membrane 50 is, for example, a thin film made of a perfluorosulfonate polymer that is impregnated with water. The solid polymer electrolyte membrane 50 has a surface area that is larger than that of each of the cathode electrode 52 and the anode electrode 54. The outer periphery of the solid polymer electrolyte membrane 50 protrudes from the outer peripheries of the cathode electrode 52 and the anode electrode 54.

As illustrated in FIG. 2, the cathode electrode 52 and the anode electrode 54 respectively include gas diffusion layers 52a and 54a and electrode catalyst layers 52b and 54b. The gas diffusion layers 52a and 54a are each made of carbon paper or the like. The electrode catalyst layers 52b and 54b are respectively made by uniformly coating surfaces of the gas diffusion layers 52a and 54a with porous carbon particles whose surfaces support a platinum alloy.

The electrode catalyst layers 52b and 54b are formed on the surfaces of the solid polymer electrolyte membrane 50. Outer peripheries of the electrode catalyst layers 52b and 54b are sandwiched between the protruding portions of the first separator 18 and the protruding portions of the second separator 20. The same applies to the second to seventh embodiments described below.

As illustrated in FIG. 4, in the first embodiment, on the surface 18a of the first separator 18, which is a cathode-side separator, a channel groove 38b is located at the lowest position in the oxidant gas channel 38 in the direction of gravity (hereinafter referred to as the lowermost channel groove). The lowermost channel groove 38b is a water accumulation portion. The inlet buffer portion 40a and the outlet buffer portion 40b are also water accumulation portions.

The membrane electrode assembly 16 includes a water impermeable layer 56, which is disposed outside of a power generation region (outside of the electrode catalyst layer 52b) and which faces the lowermost channel groove 38b, the inlet buffer portion 40a, and the outlet buffer portion 40b, which are water accumulation portions.

Figure 3:
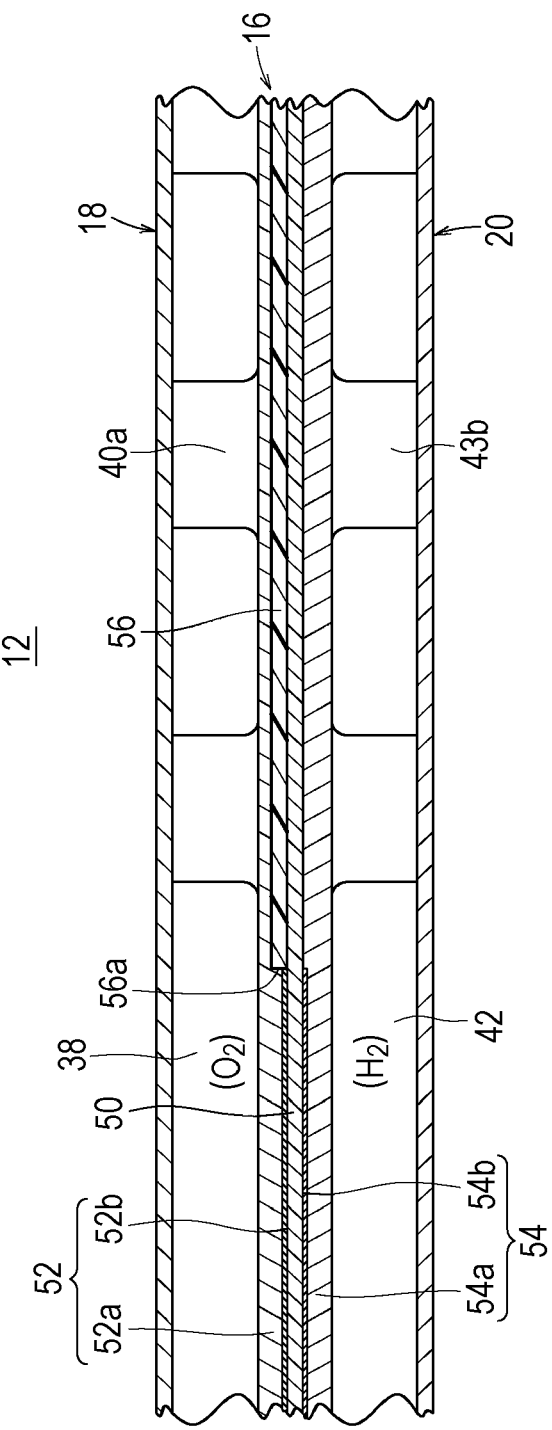
FIG. 3 is a sectional view of the power generation cell taken along line III-III of FIG. 1.
Figure 5:
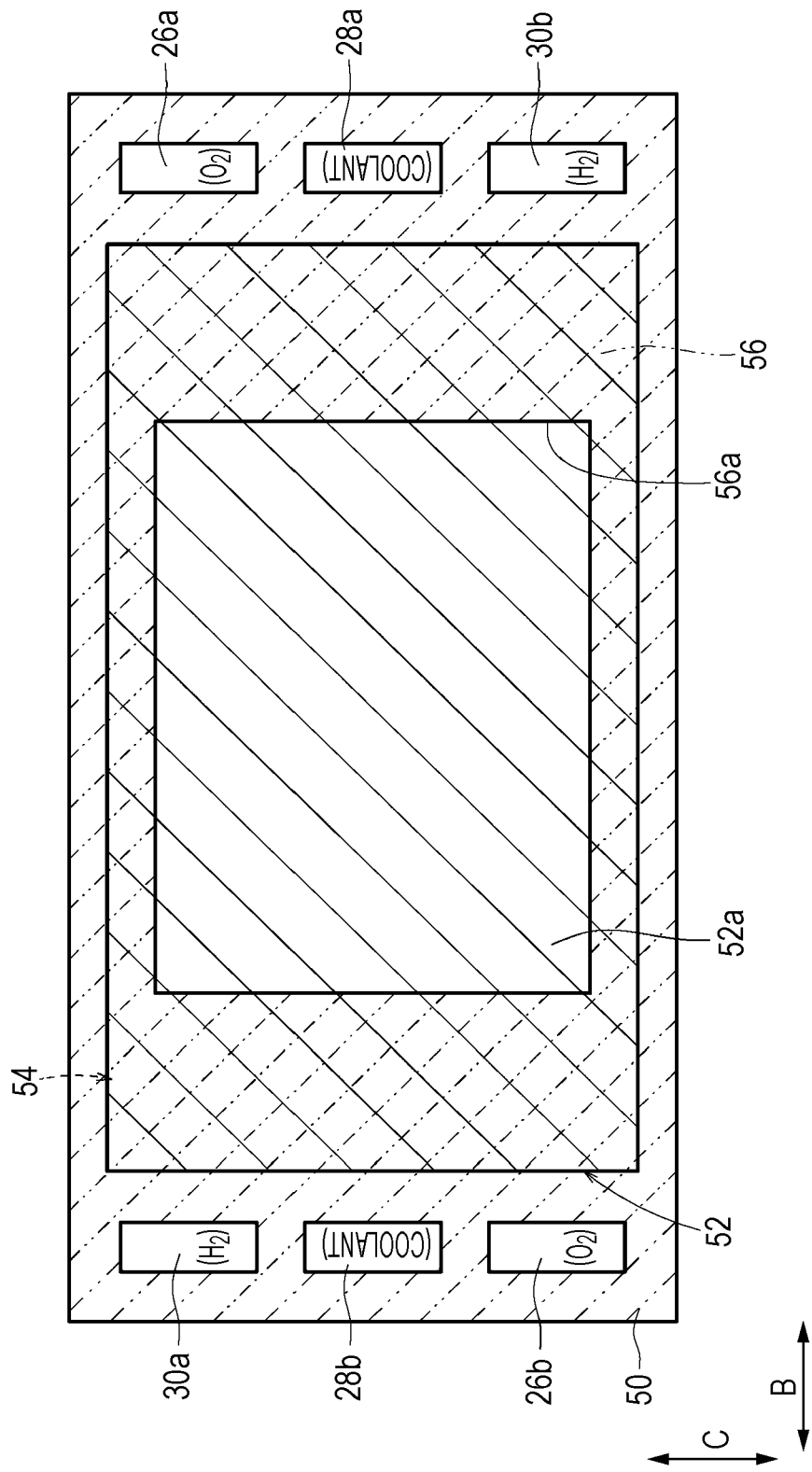
FIG. 5 is a plan view of a membrane electrode assembly of the power generation cell.

As illustrated in FIGS. 2 and 3, the water impermeable layer 56 is disposed on the cathode electrode 52 side between the solid polymer electrolyte membrane 50 and the outer periphery of the gas diffusion layer 52a. The water impermeable layer 56 has a frame-like shape (see a two-dot chain lead line in FIG. 5). The outer dimensions of the water impermeable layer 56 are the same as those of the solid polymer electrolyte membrane 50. The position of an inner end surface 56a of the water impermeable layer 56 is substantially the same as that of the outer peripheral end surface of the electrode catalyst layer 52b (see FIGS. 3 to 5). A water impermeable layer that is similar to the water impermeable layer 56 on the cathode side may be disposed on the anode side.

The shape and the position of the gas diffusion layer 52a are set so as to cover the oxidant gas channel 38, the inlet buffer portion 40a, and the outlet buffer portion 40b.

The water impermeable layer 56 is a resin film made of, for example, polytetrafluoroethylene (PTFE), polyethylene naphthalate (PEN), or polyphenylene sulfide (PPS).

The operation of the fuel cell 10 will be described below.

As illustrated in FIG. 1, in the fuel cell 10, an oxidant gas, such as an oxygen-containing gas, is supplied to the oxidant gas inlet manifold 26a. A fuel gas, such as a hydrogen-containing gas, is supplied to the fuel gas inlet manifold 30a. A coolant, such as pure water, ethylene glycol, or the like, is supplied to the coolant inlet manifold 28a. Therefore, in each power generation cell 12, the oxidant gas, the fuel gas, and the coolant are supplied in the direction of arrow A.

As illustrated in FIG. 1, the oxidant gas is introduced through the oxidant gas inlet manifold 26a into the oxidant gas channel 38 of the first separator 18 and flows along the cathode electrode 52 of the membrane electrode assembly 16. As illustrated in FIG. 1, the fuel gas is introduced through the fuel gas inlet manifold 30a into the fuel gas channel 42 of the second separator 20 and flows along the anode electrode 54 of the membrane electrode assembly 16.

Therefore, the oxidant gas and the fuel gas, which are respectively supplied to the cathode electrode 52 and the anode electrode 54, are consumed in electrochemical reactions in the electrode catalyst layers 52b and 54b of the membrane electrode assembly 16, and thereby electric power is generated.

Next, the oxidant gas supplied to the cathode electrode 52 and consumed is discharged to the oxidant gas outlet manifold 26b and flows in the direction of arrow A. Likewise, the oxidant gas supplied to the anode electrode 54 and consumed is discharged to the fuel gas outlet manifold 30b and flows in the direction of arrow A.

The coolant is introduced through the coolant inlet manifold 28a into the coolant channel 44 between the first and second separators 18 and 20 and flows in the direction of arrow B. The coolant cools the membrane electrode assembly 16, flows through the coolant outlet manifold 28b, and is discharged from the fuel cell 10.

As illustrated in FIG. 4, in the first embodiment, the lowermost channel groove 38b of the oxidant gas channel 38, the inlet buffer portion 40a, and the outlet buffer portion 40b, which are water accumulation portions, are disposed on the surface 18a of the first separator 18.

The membrane electrode assembly 16 includes the water impermeable layer 56, which is disposed outside of the electrode catalyst layer 52b (a power generation region) and which faces the lowermost channel groove 38b, the inlet buffer portion 40a, and the outlet buffer portion 40b, which are water accumulation portions.

To be specific, as illustrated in FIG. 2, a part of the water impermeable layer 56, which has an inner edge portion interposed between the solid polymer electrolyte membrane 50 and the gas diffusion layer 52a and extends downward from the outer periphery of the gas diffusion layer 52a, is disposed between the solid polymer electrolyte membrane 50 and the cathode electrode 52.

Therefore, in the lowermost channel groove 38b, where water tends to accumulate, metal ions leached from, in particular, the first separator 18 are blocked by the water impermeable layer 56 and do not move toward the solid polymer electrolyte membrane 50. The same applies to the second to seventh embodiments described below. Thus, degradation of the solid polymer electrolyte membrane 50 can be reliably reduced.

Likewise, as illustrated in FIG. 3, the water impermeable layer 56, which is interposed between the solid polymer electrolyte membrane 50 and the gas diffusion layer 52a, is disposed so as to face the inlet buffer portion 40a. Therefore, even when metal ions are leached into the water in the inlet buffer portion 40a, where water tends to accumulate, the metal ions are blocked by the water impermeable layer 56 and do not contact the solid polymer electrolyte membrane 50. Therefore, degradation of the solid polymer electrolyte membrane 50 can be reliably reduced. For the outlet buffer portion 40b, the water impermeable layer 56 has an effect the same that for the inlet buffer portion 40a.

Figure 6:
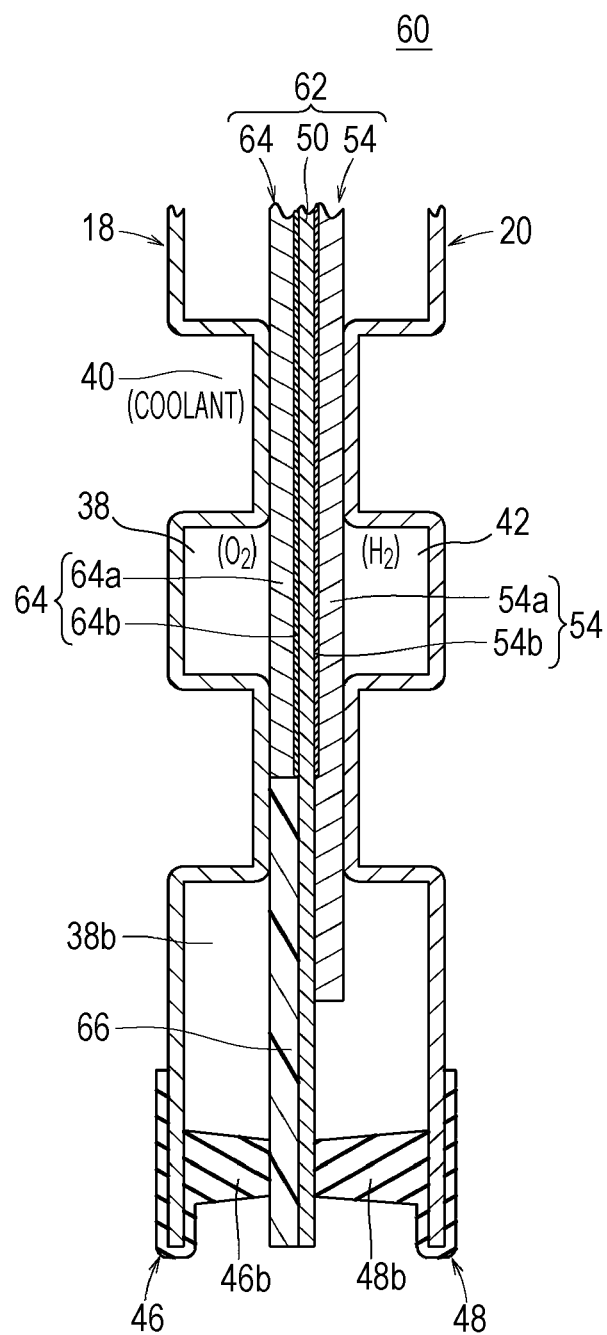
FIG. 6 is a sectional view of a main part of a fuel cell according to a second embodiment.

FIG. 6 is a sectional view of a main part of a fuel cell 60 according to a second embodiment. The elements of the fuel cell 60 the same as those of the fuel cell 10 according to the first embodiment will be denoted by the same numerals and detailed descriptions thereof will be omitted. Likewise, in third to seventh embodiments described below, detailed descriptions of such elements will be omitted.

The fuel cell 60 includes a membrane electrode assembly (MEA) 62 and the first and second separators 18 and 20 sandwiching the membrane electrode assembly 62 therebetween. The membrane electrode assembly 62 includes the solid polymer electrolyte membrane 50 and a cathode electrode 64 and the anode electrode 54 sandwiching the solid polymer electrolyte membrane 50 therebetween.

The cathode electrode 64 includes a gas diffusion layer 64a and an electrode catalyst layer 64b, which have substantially the same surface area. The gas diffusion layer 64a has a surface area that is smaller that that of the gas diffusion layer 54a of the anode electrode 54. The electrode catalyst layers 54b and 64b have substantially the same surface area.

A water impermeable layer 66 is disposed on a surface of the solid polymer electrolyte membrane 50 that protrudes outward from the outer periphery of the gas diffusion layer 64a. The water impermeable layer 66 is made of a material similar to that of the water impermeable layer 56 according to the first embodiment. The same applies to the third to seventh embodiments described below.

Figure 7:
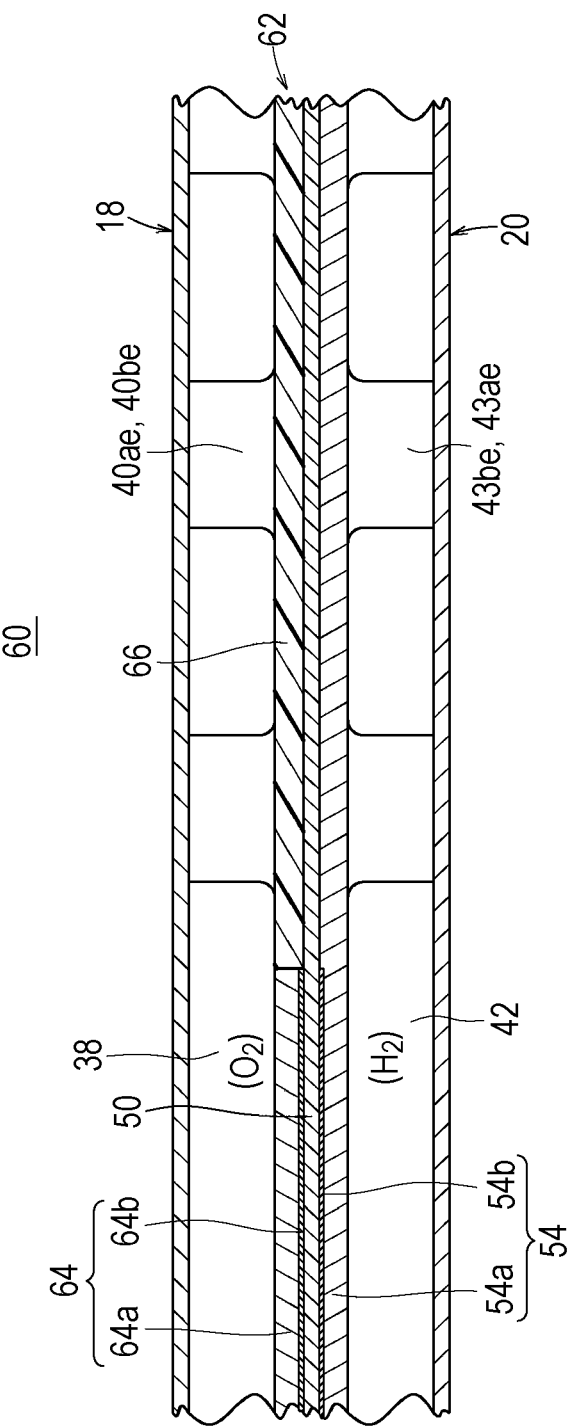
FIG. 7 is another sectional view of the fuel cell according to the second embodiment.

The water impermeable layer 66 is disposed on the oxidant gas channel 38 side of the first separator 18 in a region facing the lowermost channel groove 38b and in a region facing the embossed portions 40ae of the inlet buffer portion 40a and the embossed portions 40be of the outlet buffer portion 40b (see FIGS. 6 and 7). Therefore, the solid polymer electrolyte membrane 50 is isolated from water accumulation portions, and thereby degradation of the membrane 50 due to metal ions dissolved in water can be reduced as much as possible.

Alternatively, the gas diffusion layer 54a of the anode electrode 54 may have a surface area that is smaller than that of the gas diffusion layer 64a of the cathode electrode 64. The water impermeable layer 66 may be disposed in the outer periphery of the anode electrode 54. The water impermeable layer 66 may have embossed portions or a guide channel, and the first separator 18 may have a flat surface.

Figure 8:
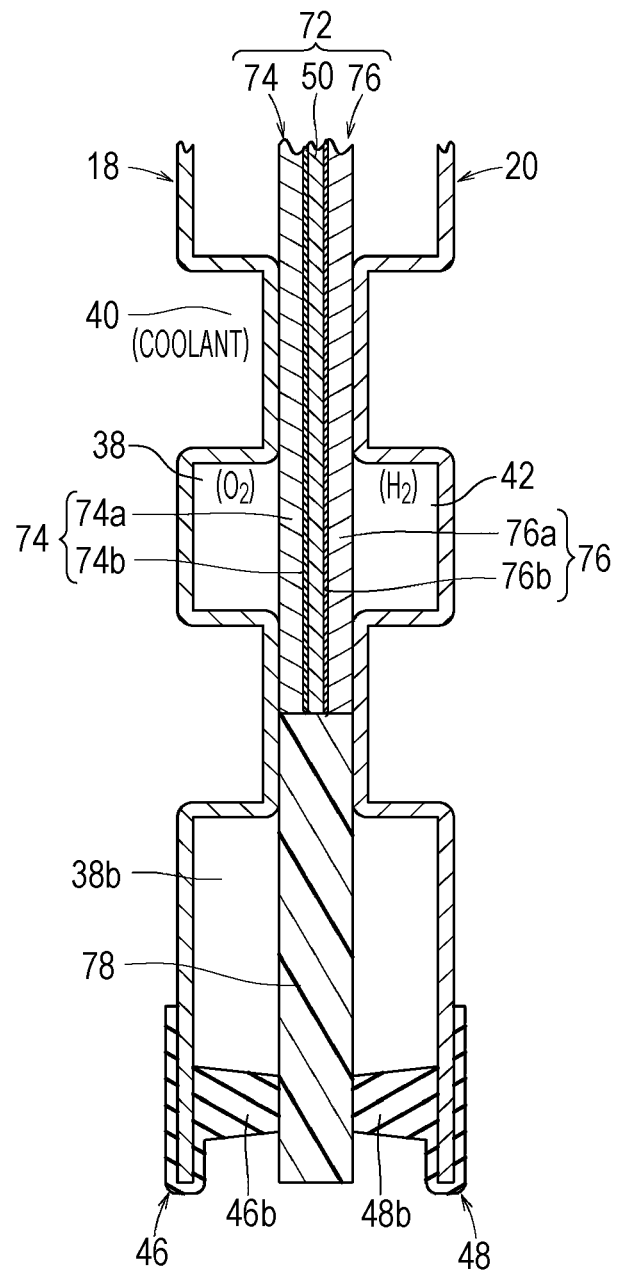
FIG. 8 is a sectional view of a main part of a fuel cell according to a third embodiment.
Figure 9:
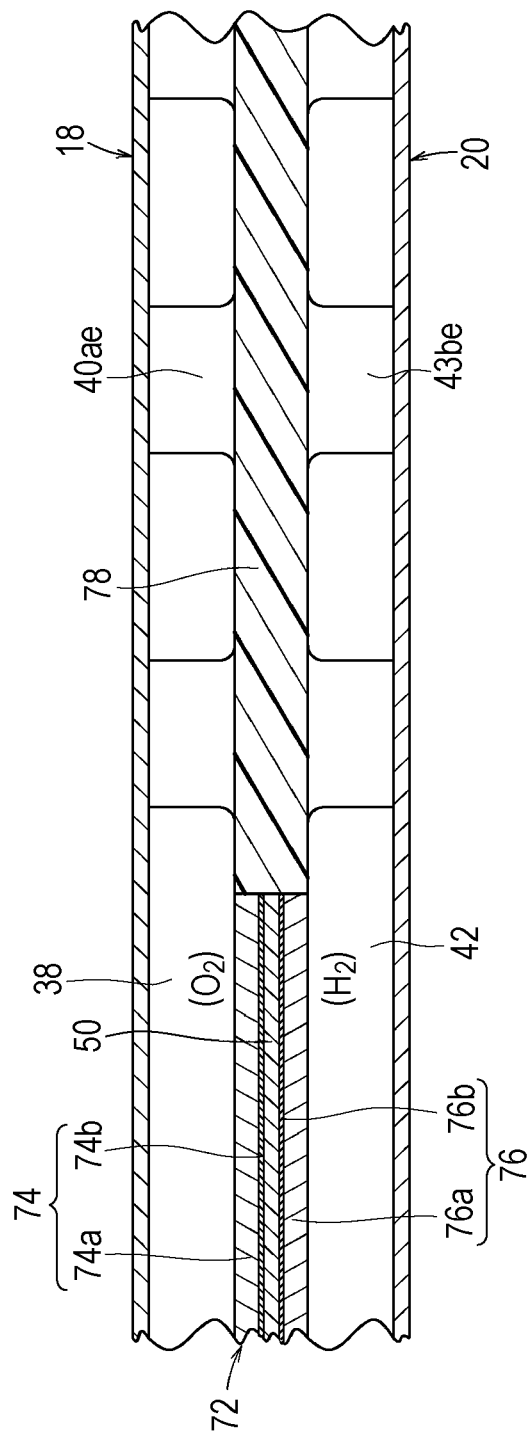
FIG. 9 is another sectional view of the fuel cell according to the third embodiment.

As illustrated in FIGS. 8 and 9, a fuel cell 70 according to a third embodiment includes a membrane electrode assembly 72 and the first and second separators 18 and 20 sandwiching the membrane electrode assembly 72 therebetween.

The membrane electrode assembly 72 includes a cathode electrode 74 and an anode electrode 76 that sandwich the solid polymer electrolyte membrane 50 therebetween. The cathode electrode 74 and the anode electrode 76 have the same surface area, and respectively include gas diffusion layers 74a and 76a having the same dimensions and electrode catalyst layers 74b and 76b having the same dimensions.

A resin frame 78, which is a water impermeable layer, is disposed on the outer periphery of the membrane electrode assembly 72. The resin frame 78 have a thickness the same as that of the membrane electrode assembly 72 and has a shape (frame-like shape) the same as those of the water impermeable layers 56 and 66 of the first and second embodiments.

Therefore, with the third embodiment, the solid polymer electrolyte membrane 50 is isolated from the water accumulation portions, and thereby degradation of the membrane 50 due to metal ions dissolved in water can be reduced as much as possible, as with the first and second embodiments.

Figure 10:
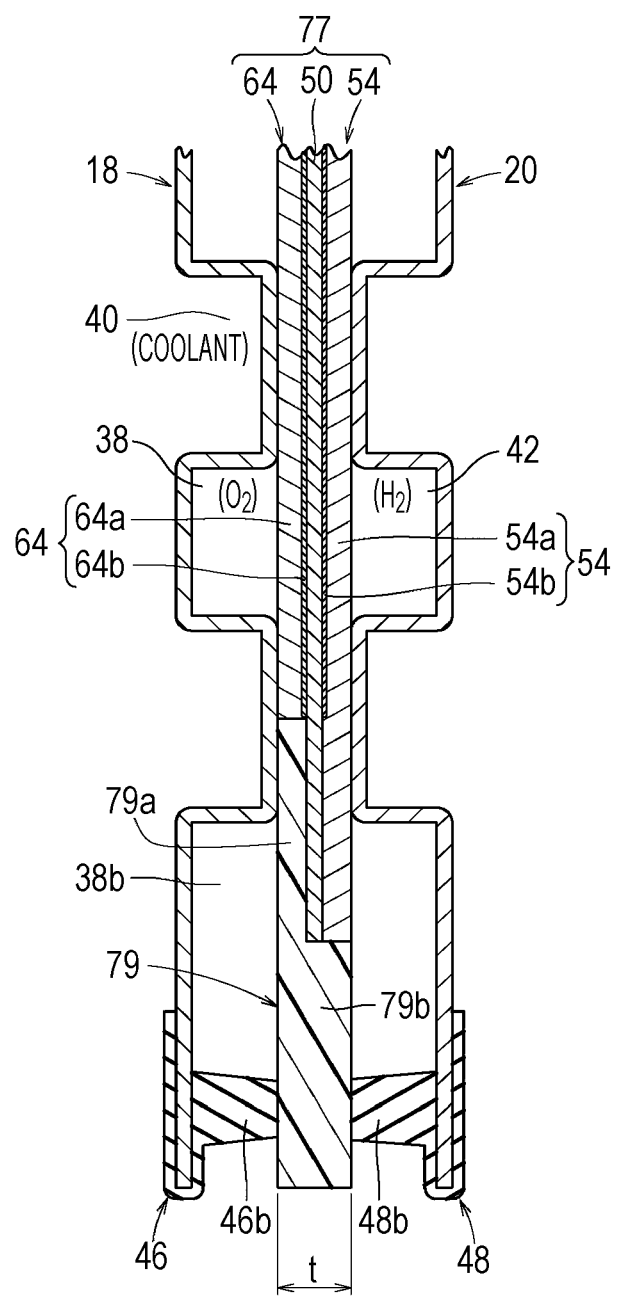
FIG. 10 is a sectional view of a main part of a fuel cell according to a fourth embodiment.

FIG. 10 is a sectional view of a main part of a fuel cell 75 according to a fourth embodiment. The fuel cell 75 includes a membrane electrode assembly 77 and the first and second separators 18 and 20 sandwiching the membrane electrode assembly 77 therebetween. The elements of the fuel cell 75 the same as those of the second embodiments will be denoted by the same numerals and detailed descriptions thereof will be omitted.

A water impermeable layer 79 is disposed so as to cover a surface of the solid polymer electrolyte membrane 50 extending outward from the outer periphery of the gas diffusion layer 64a and so as to protrude from an end surface of the solid polymer electrolyte membrane 50. The water impermeable layer 79 includes a thin portion 79a disposed on the surface of the solid polymer electrolyte membrane 50 and a thick portion 79b having a thickness t that is the same as that of the membrane electrode assembly 77. It is not necessary that the thick portion 79b have a uniform thickness.

With the fourth embodiment, the solid polymer electrolyte membrane 50 is covered by the water impermeable layer 79 and is not exposed to the outside, and thereby degradation of the solid polymer electrolyte membrane 50 can be more reliably reduced.

Figure 11:
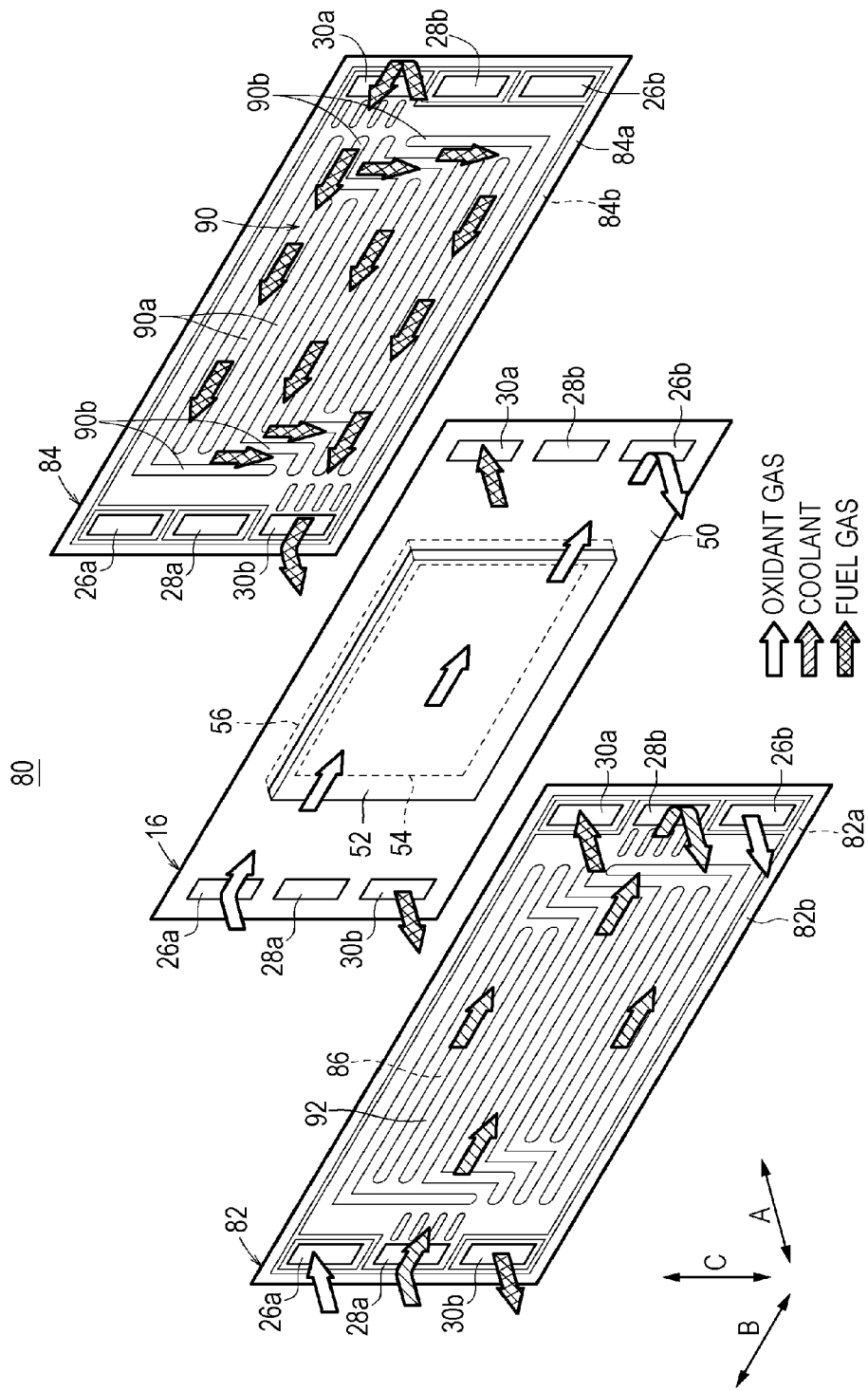
FIG. 11 is an exploded perspective view of a fuel cell according to a fifth embodiment.

As illustrated in FIG. 11, a fuel cell 80 according to a fifth embodiment includes the membrane electrode assembly 16 and first and second separators 82 and 84 sandwiching the membrane electrode assembly 16 therebetween.

Figure 12:
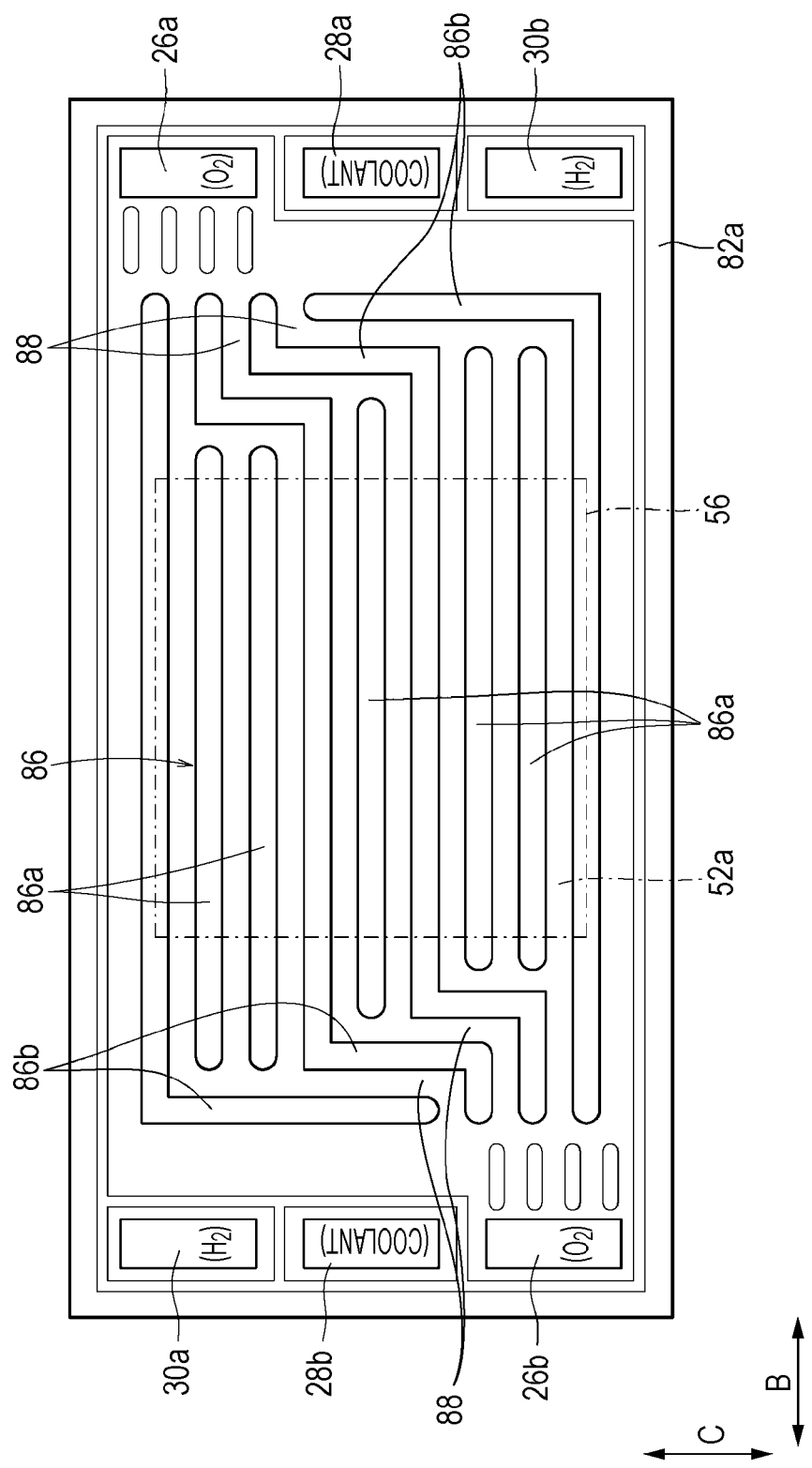
FIG. 12 is a plan view of a first separator of the fuel cell according to the fifth embodiment.

As illustrated in FIG. 12, an oxidant gas channel 86 is formed on a surface 82a of the first separator 82 facing the membrane electrode assembly 16. The oxidant gas channel 86 includes a plurality of linear protruding portions 86a and a plurality of bent protruding portions 86b. The linear protruding portions 86a extend in the direction of arrow B. The bent protruding portions 86b include linear portions extending in the direction of arrow B and at least one bent portion that is bent in the direction of arrow C. Channels are formed between the linear protruding portions 86a and the bent protruding portions 86b.

Ends of the bent protruding portions 86b in the vicinities of the oxidant gas inlet manifold 26a and the oxidant gas outlet manifold 26b are respectively disposed close to each other. Junction portions 88, in which a plurality of channels are joined to each other, are formed on the oxidant gas inlet manifold 26a side and on the oxidant gas outlet manifold 26b side.

As illustrated in FIG. 11, a fuel gas channel 90 is formed on a surface 84a of the second separator 84 facing the membrane electrode assembly 16. As with the oxidant gas channel 86, the fuel gas channel 90 is formed between a plurality of linear protruding portions 90a and a plurality of bent protruding portions 90b, and connects the fuel gas inlet manifold 30a and the fuel gas outlet manifold 30b to each other. A coolant channel 92 is formed between a surface 82b of the first separator 82 and a surface 84b of the second separator 84.

As illustrated in FIG. 12, in the fifth embodiment, the junction portions 88, in which the channel grooves are joined to each other, are disposed in the oxidant gas channel 86 of the first separator 82. The water impermeable layer 56 is disposed in the membrane electrode assembly 16 so as to face the junction portions 88, which are water accumulation portions.

Therefore, the solid polymer electrolyte membrane 50 is isolated from the junction portions 88, and thereby degradation of the membrane 50 due to metal ions dissolved in water can be reduced as much as possible, as with the first to fourth embodiments.

Figure 13:
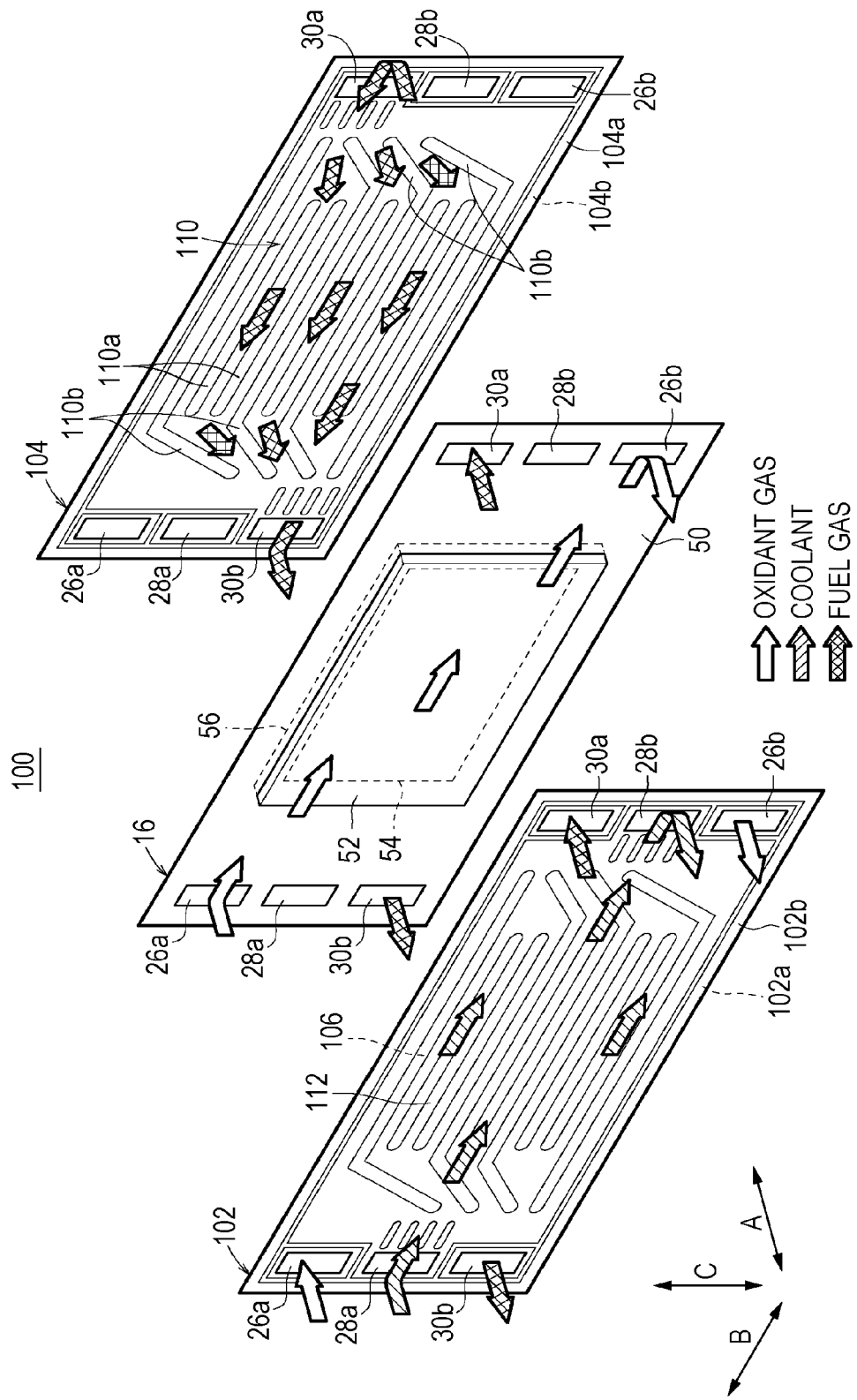
FIG. 13 is an exploded perspective view of a fuel cell according to a sixth embodiment.

As illustrated in FIG. 13, a fuel cell 100 according to a sixth embodiment includes the membrane electrode assembly 16 and first and second separators 102 and 104 sandwiching the membrane electrode assembly 16 therebetween.

Figure 14:
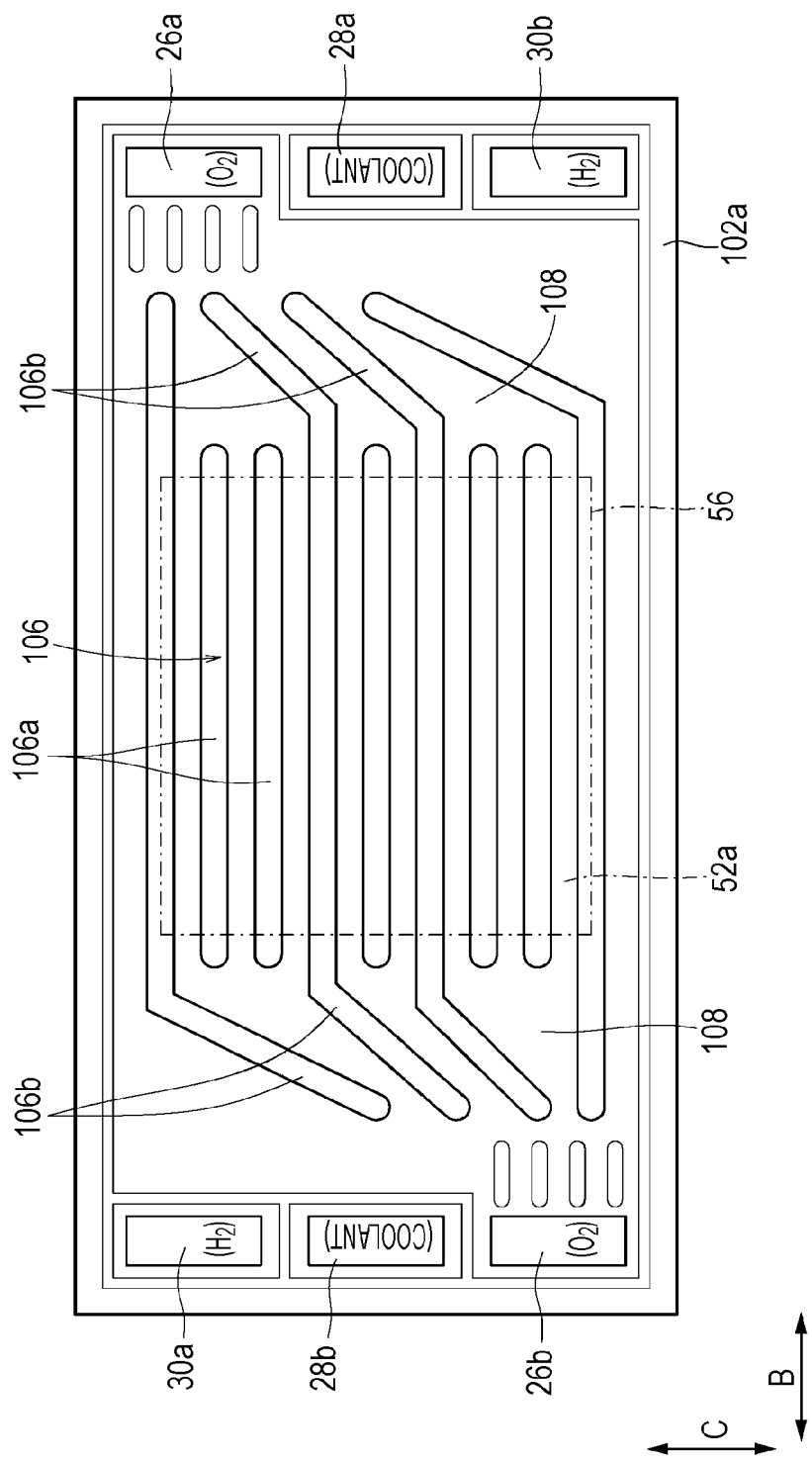
FIG. 14 is a plan view of a first separator of the fuel cell according to the sixth embodiment.

As illustrated in FIG. 14, an oxidant gas channel 106 is formed on a surface 102a of the first separator 102 facing the membrane electrode assembly 16. The oxidant gas channel 106 includes a plurality of linear protruding portions 106a and a plurality of inclined protruding portions 106b. The linear protruding portions 106a extend in the direction of arrow B. The inclined protruding portions 106b include linear portions extending in the direction of arrow B and inclined portions inclined toward at least one of the oxidant gas inlet manifold 26a and the oxidant gas outlet manifold 26b. Channels are formed between the linear protruding portions 106a and the inclined protruding portions 106b.

Junction portions 108, in which the plurality of channel grooves are joined to each other, are formed on the oxidant gas outlet manifold 26b side. The water impermeable layer 56 is disposed in the membrane electrode assembly 16 so as to face the junction portions 108, which are water accumulation portions.

As illustrated in FIG. 13, a fuel gas channel 110 is formed on a surface 104a of the second separator 104 facing the membrane electrode assembly 16. As with the oxidant gas channel 106, the fuel gas channel 110 includes channel grooves formed by a plurality of linear protruding portions 110a and a plurality of inclined protruding portions 110b. A coolant channel 112 is formed between a surface 102b of the first separator 102 and a surface 104b of the second separator 104.

In the sixth embodiment, the water impermeable layer 56 is disposed in the membrane electrode assembly 16 so as to face the junction portions 108, which are water accumulation portions. Therefore, degradation of the solid polymer electrolyte membrane 50 can be reduced as much as possible, as with the first to fifth embodiments.

Figure 15:
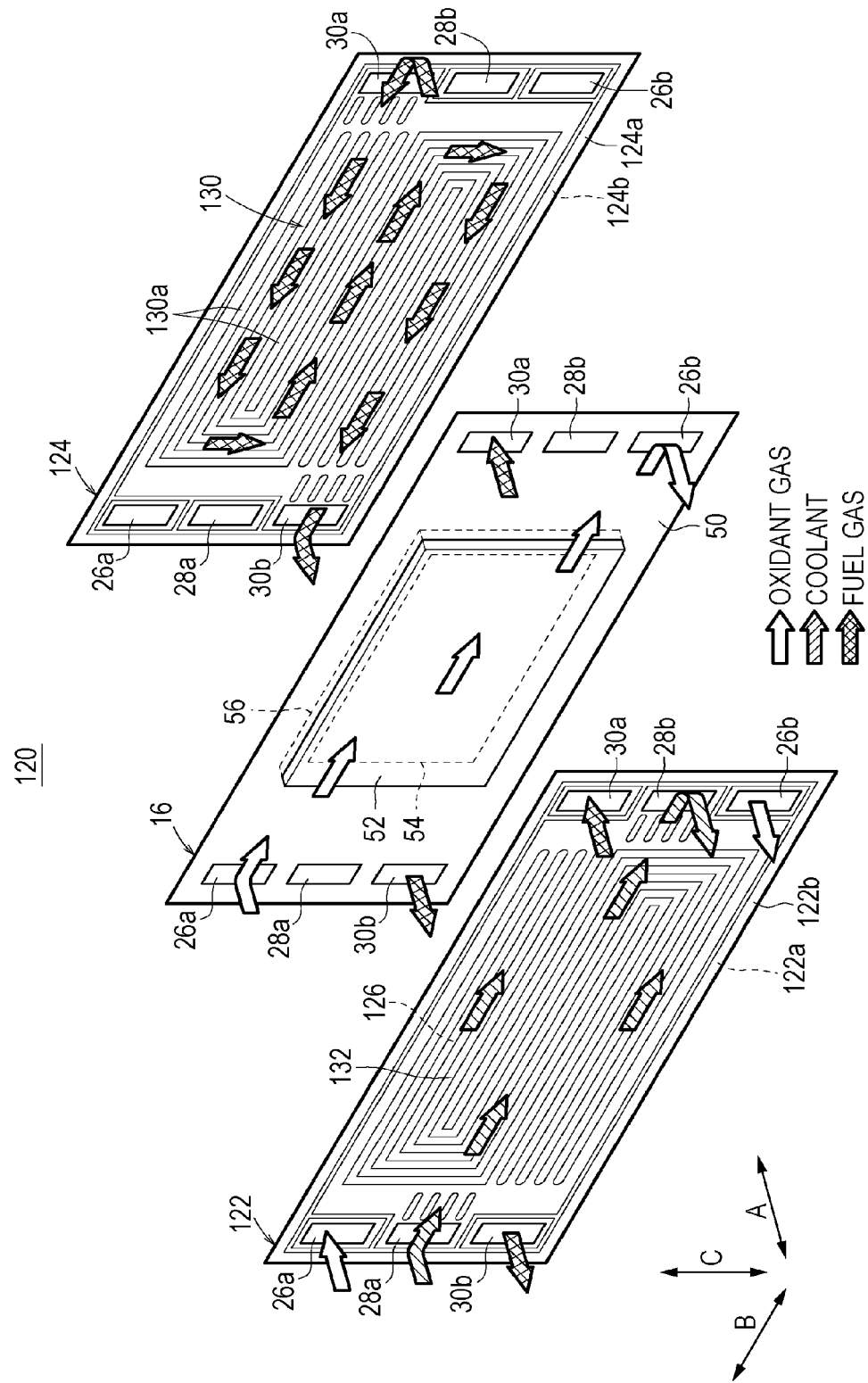
FIG. 15 is an exploded perspective view of a fuel cell according to a seventh embodiment.

As illustrated in FIG. 15, a fuel cell 120 according to a seventh embodiment includes the membrane electrode assembly 16 and first and second separators 122 and 124 sandwiching the membrane electrode assembly 16 therebetween.

Figure 16:
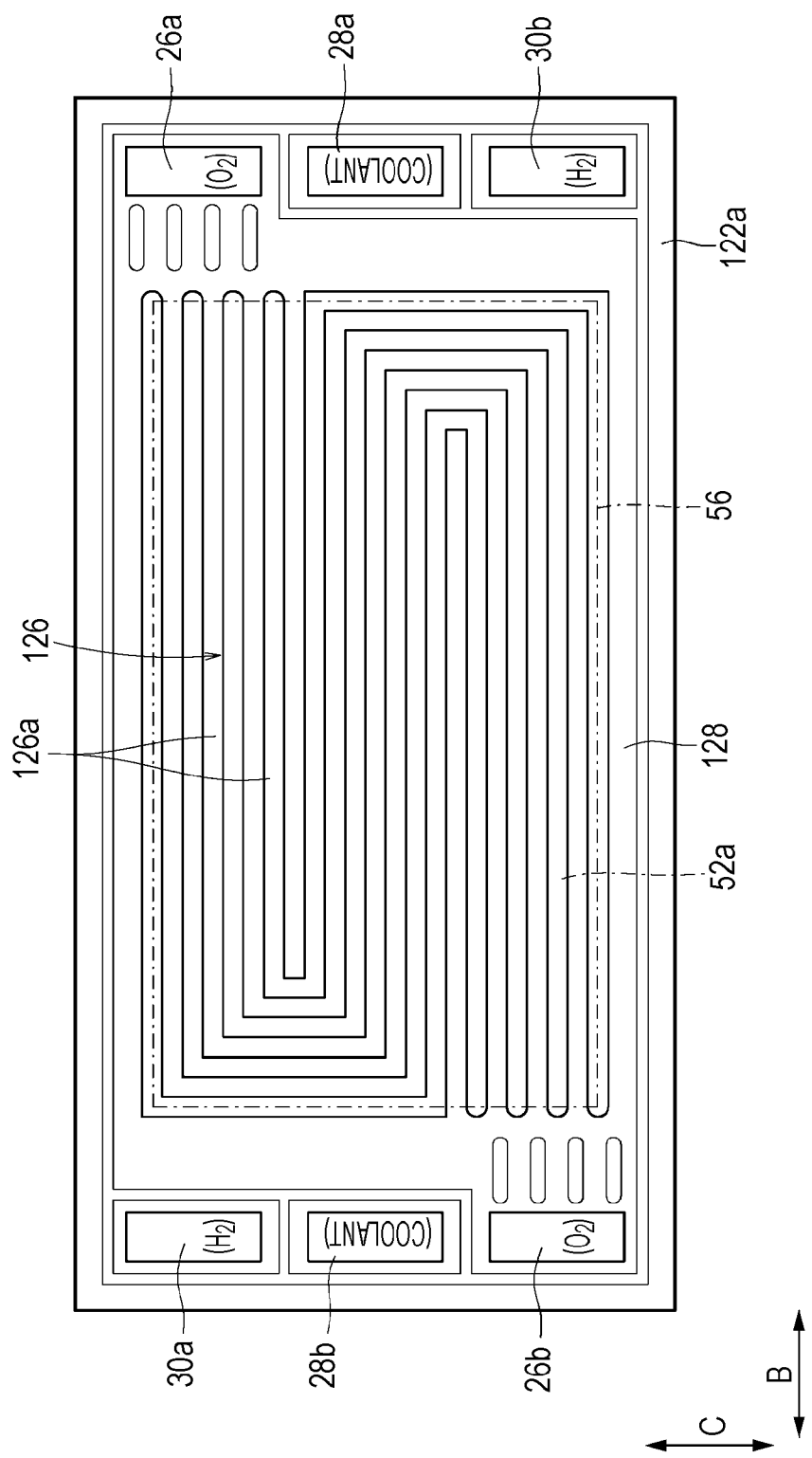
FIG. 16 is a plan view of a first separator of the fuel cell according to the seventh embodiment.
Figure 17:
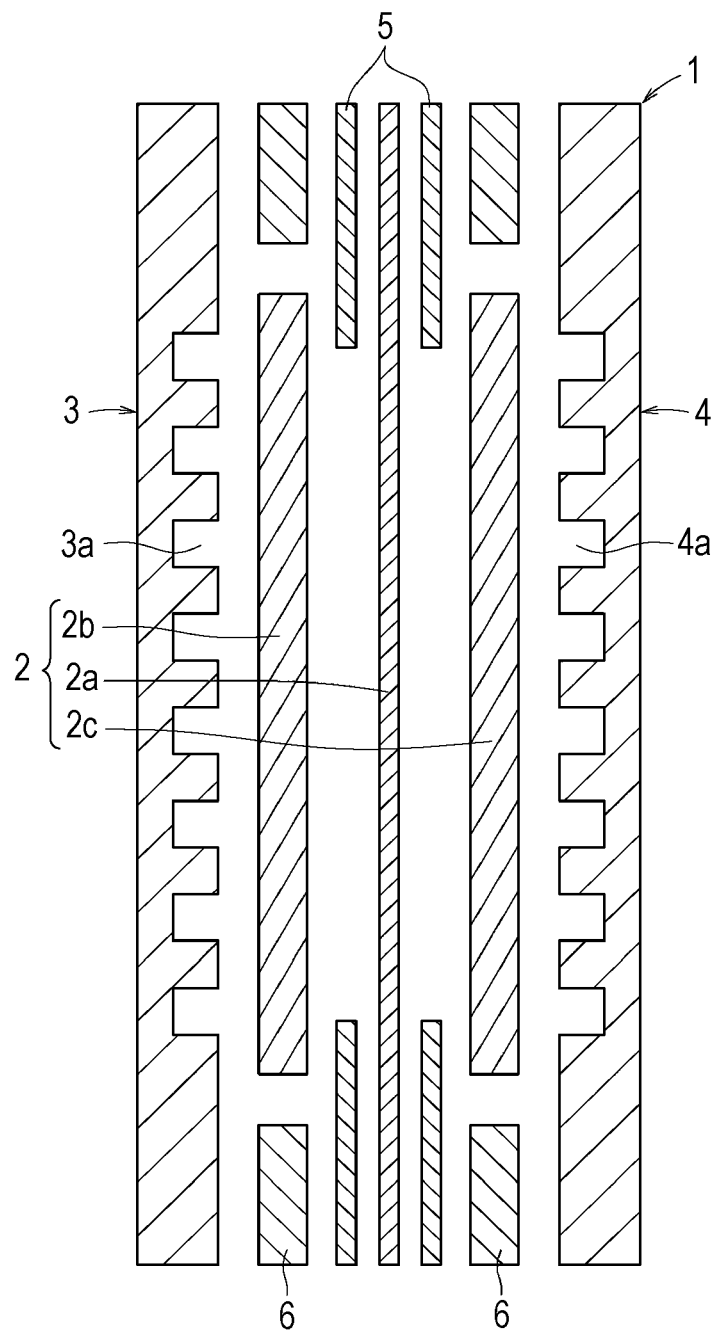
FIG. 17 is an exploded view of an existing sealing structure.

As illustrated in FIG. 16, an oxidant gas channel 126 is formed on a surface 122a of the first separator 122 facing the membrane electrode assembly 16. The oxidant gas channel 126 includes channel grooves formed between a plurality of serpentine protruding portions 126a, which meander in the direction of arrow B. The oxidant gas flows in the direction of arrow C through the channel grooves.

A bypass channel 128 is formed on the outer periphery of the oxidant gas channel 126 so as to bypass the serpentine protruding portions 126a and so as to connect the oxidant gas inlet manifold 26a to the oxidant gas outlet manifold 26b. The bypass channel 128 is a water accumulation portion, and the water impermeable layer 56 is disposed in the membrane electrode assembly 16 so as to face the bypass channel 128.

As illustrated in FIG. 15, a fuel gas channel 130, which is a serpentine channel, is formed on a surface 124a of the second separator 124 facing the membrane electrode assembly 16. The fuel gas channel 130 includes channel grooves formed between a plurality of serpentine protruding portions 130a. A coolant channel 132 is formed between a surface 122b of the first separator 122 and a surface 124b of the second separator 124.

In the seventh embodiment, the water impermeable layer 56 is disposed in the membrane electrode assembly 16 so as to face the bypass channel 128, which is a water accumulation portion. Thus, degradation of the solid polymer electrolyte membrane 50 can be reduced as much as possible, as with the first to sixth embodiments.

In the fifth to seventh embodiments, the membrane electrode assembly 16 according to the first embodiment is used. However, the membrane electrode assembly is not limited this one. For example, the membrane electrode assembly 62 according to the second embodiment, which includes the water impermeable layer 66, or the membrane electrode assembly 72 according to the third embodiment, which includes the resin frame 78 as a water impermeable layer, may be used.

According to an embodiment, a fuel cell includes a membrane electrode assembly and a separator. The membrane electrode assembly includes a solid polymer electrolyte membrane and a pair of electrodes sandwiching the solid polymer electrolyte membrane therebetween. The membrane electrode assembly and the separator are disposed in an upright position and stacked in a horizontal direction.

In the fuel cell according to the embodiment, the separator includes a water accumulation portion that is at least one of a buffer portion connected to a reactant gas channel through which a reactant gas flows along a power generation surface, a channel groove of the reactant gas channel located at a lowest position in the reactant gas channel in a direction of gravity, a channel junction portion in which channel grooves of the reactant gas channel are joined, and a bypass channel that bypasses the reactant gas channel. The membrane electrode assembly includes a water impermeable layer disposed outside of a power generation region and facing the water accumulation portion.

In the fuel cell according to the embodiment, it is preferable that the pair of electrodes include a cathode electrode and the water impermeable layer be disposed at least on the cathode electrode side of the membrane electrode assembly.

In the embodiment, the membrane electrode assembly includes the water impermeable layer facing the water accumulation portion. Therefore, the solid polymer electrolyte membrane is isolated from the water accumulation portion, and therefore degradation of the membrane due to metal ions dissolved in water can be reduced as much as possible.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
   a membrane electrode assembly comprising:
      a first electrode;
      a second electrode; and
      a solid polymer electrolyte membrane provided between the first electrode and the second electrode in a stacking direction; and
   a separator, the membrane electrode assembly and the separator being stacked in the stacking direction, the separator including a water accumulation portion comprising at least one of
      a buffer portion connected to a reactant gas channel through which a reactant gas is to flow along a power generation surface of the membrane electrode assembly,
      a channel groove provided in the reactant gas channel and located at a lowest position in the reactant gas channel in a direction of gravity when the membrane electrode assembly and the separator are in an upright position,
      a channel junction portion in which channel grooves of the reactant gas channel are joined, and
      a bypass channel to bypass the reactant gas channel,
   wherein the membrane electrode assembly includes a water impermeable layer which is disposed outside of a power generation region of the membrane electrode assembly, the water impermeable layer directly facing the water accumulation portion in the stacking direction, and
   wherein the water accumulation portion is provided on a surface of the separator that faces the membrane electrode assembly.

2. The fuel cell according to claim 1,
wherein one of the first electrode and the second electrode includes a cathode electrode disposed on a cathode electrode side with respect to the membrane electrode assembly, and
wherein the water impermeable layer is disposed at least on the cathode electrode side of the membrane electrode assembly.

3. The fuel cell according to claim 2,
wherein the cathode electrode includes a gas diffusion layer, and
wherein the water impermeable layer is disposed between the solid polymer electrolyte membrane and an outer periphery of the gas diffusion layer.

4. The fuel cell according to claim 1,
wherein the water impermeable layer is in direct contact with the membrane electrode assembly.

5. The fuel cell according to claim 1,
wherein the water impermeable layer is in direct contact with at least one of the first electrode and the second electrode.

6. The fuel cell according to claim 5,
wherein the water impermeable layer is in direct contact with the solid polymer electrolyte membrane.

7. The fuel cell according to claim 1,
wherein the water impermeable layer is in direct contact with the solid polymer electrolyte membrane.

8. The fuel cell according to claim 1,
wherein the water accumulation portion is sandwiched between the water impermeable layer and the surface of the separator that faces the membrane electrode assembly.

9. The fuel cell according to claim 1,
wherein the water accumulation portion is provided on a surface of the separator that directly faces the membrane electrode assembly in the stacking direction.

10. The fuel cell according to claim 1,
wherein a surface of the water impermeable layer defines a side of the water accumulation portion, and
wherein the surface of the water impermeable layer faces in the stacking direction.

* * * * *